(12) United States Patent
McDaniel et al.

(10) Patent No.: US 7,897,539 B2
(45) Date of Patent: Mar. 1, 2011

(54) METHODS OF PREPARING A POLYMERIZATION CATALYST

(75) Inventors: Max P. McDaniel, Bartlesville, OK (US); Elizabeth A. Benham, Spring, TX (US); Randall S. Muninger, Dewey, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 830 days.

(21) Appl. No.: 11/749,663

(22) Filed: May 16, 2007

(65) Prior Publication Data

US 2008/0287287 A1 Nov. 20, 2008

(51) Int. Cl.
*B01J 20/284* (2006.01)
*C08F 4/64* (2006.01)
*C08F 4/6592* (2006.01)
*C08F 4/02* (2006.01)

(52) U.S. Cl. .................. 502/415; 502/104; 502/114; 502/120; 502/152; 502/414; 526/160; 526/352; 526/943

(58) Field of Classification Search .............. 502/414, 502/415, 104, 114, 120, 152; 526/160, 352, 526/943
See application file for complete search history.

(56) References Cited

U.S. PATENT DOCUMENTS

| | | |
|---|---|---|
| 2,959,577 A | 11/1960 | Hogan |
| 3,168,460 A | 2/1965 | Lehman et al. |
| 3,248,179 A | 4/1966 | Norwood |
| 3,624,063 A | 11/1971 | Witt |
| 3,821,123 A | 6/1974 | Germanas et al. |
| 3,838,039 A | 9/1974 | Vesley et al. |
| 3,976,632 A | 8/1976 | Delap |
| 4,246,095 A | 1/1981 | Antos |
| 4,444,966 A | 4/1984 | McDaniel |
| 4,501,885 A | 2/1985 | Sherk et al. |
| 4,588,790 A | 5/1986 | Jenkins, III et al. |
| 4,607,019 A | 8/1986 | Best |
| 4,690,990 A | 9/1987 | McDaniel et al. |
| 4,803,253 A | 2/1989 | McDaniel et al. |
| 4,806,513 A | 2/1989 | McDaniel et al. |
| 4,855,271 A | 8/1989 | McDaniel et al. |
| 4,939,217 A | 7/1990 | Stricklen |
| 5,037,911 A | 8/1991 | McDaniel et al. |
| 5,179,178 A | 1/1993 | Stacy et al. |
| 5,182,247 A | 1/1993 | Kuhlmann et al. |
| 5,191,132 A | 3/1993 | Patsidis et al. |
| 5,200,379 A | 4/1993 | McDaniel et al. |
| 5,210,352 A | 5/1993 | Alt et al. |
| 5,237,025 A | 8/1993 | Benham et al. |
| 5,244,990 A | 9/1993 | Mitchell |
| 5,270,273 A | 12/1993 | Pelrine et al. |
| 5,275,992 A | 1/1994 | Mitchell et al. |
| 5,347,026 A | 9/1994 | Patsidis et al. |
| 5,352,749 A | 10/1994 | DeChellis et al. |
| 5,399,636 A | 3/1995 | Alt et al. |
| 5,401,817 A | 3/1995 | Palackal et al. |
| 5,401,820 A | 3/1995 | McDaniel et al. |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,455,314 A | 10/1995 | Burns et al. |
| 5,480,848 A | 1/1996 | Geerts |
| 5,494,571 A | 2/1996 | Umansky et al. |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 5,883,036 A | 3/1999 | Fujie et al. |

(Continued)

FOREIGN PATENT DOCUMENTS

EP 0 628 574 A1 12/1994

(Continued)

OTHER PUBLICATIONS

Bird, Byron R., et al., "Dynamics of Polymeric Liquids," Fluid Mechanics, 1987, 10 pgs., vol. 1, Second Edition, John Wiley & Sons.

(Continued)

*Primary Examiner*—Caixia Lu
(74) *Attorney, Agent, or Firm*—Conley Rose, P.C.; Rodney B. Carroll; Cheryl L. Huseman

(57) ABSTRACT

A method of preparing a composition comprising dry mixing commercial grade alumina and a solid sulfating agent to form a mixture and calcining the mixture to form a sulfated alumina support.

20 Claims, No Drawings

U.S. PATENT DOCUMENTS

| | | |
|---|---|---|
| 5,965,675 A | 10/1999 | Kellum et al. |
| 5,998,558 A | 12/1999 | Wasserman et al. |
| 6,107,230 A | 8/2000 | McDaniel et al. |
| 6,239,235 B1 | 5/2001 | Hottovy et al. |
| 6,262,191 B1 | 7/2001 | Hottovy et al. |
| 6,300,271 B1 | 10/2001 | McDaniel et al. |
| 6,326,328 B1 | 12/2001 | Matsuzawa |
| 6,734,266 B2 | 5/2004 | Gao et al. |
| 6,833,415 B2 | 12/2004 | Kendrick et al. |
| 6,867,277 B2 | 3/2005 | Iseki |
| 6,867,278 B2 | 3/2005 | McDaniel et al. |
| 7,112,643 B2 | 9/2006 | McDaniel et al. |
| 7,119,043 B2 | 10/2006 | Martin et al. |
| 7,214,642 B2 | 5/2007 | McDaniel et al. |
| 2007/0060722 A1 | 3/2007 | Jayaratne et al. |

FOREIGN PATENT DOCUMENTS

| | | |
|---|---|---|
| EP | 0 734 766 A1 | 10/1996 |
| EP | 0925830 A1 | 6/1999 |
| WO | WO 99/60033 | 11/1999 |
| WO | WO 01/32307 | 5/2001 |
| WO | 2005107943 A1 | 11/2005 |
| WO | 2008143802 A1 | 11/2008 |

OTHER PUBLICATIONS

Hieber, C. A., et al., "Some correlations involving the shear viscosity of polystyrene melts," Rheologica Acta, 1989, pgs. 321-332, vol. 28, No. 4.

Hieber, C. A., et al., "Shear-Rate-Dependence Modeling of Polymer Melt Viscosity," Polymer Engineering and Science, Jul. 1992, pp. 931-938, vol. 32, No. 14.

McDaniel, M. P., "Supported Chromium Catalysts for Ethylene Polymerization," Advances in Catalysis, 1985, pp. 47-98, vol. 33, Academic Press, Inc.

Foreign communication from a related counterpart application—International Search Report, PCT/US2005/009668, Oct. 5, 2005, 6 pgs.

Hochmann, Tomas and Setinek, Karel, *Preparation of Strong Acid Catalysts by Sulfate Treatment of Calcined Boehmite*, Collect, Czech. Chem. Commun. (vol. 57). (1992), pp. 2241-2247.

International Patent Application No. PCT/US2008/005968 Search Report.

METHODS OF PREPARING A POLYMERIZATION CATALYST

FIELD OF THE INVENTION

The present disclosure relates to catalyst compositions. More specifically, the present disclosure relates to methods of preparing polymerization catalyst compositions.

BACKGROUND OF THE INVENTION

Supported polymerization catalysts are commonly employed to prepare polyolefins having desirable characteristics. Various supports for polymerization catalysts have been disclosed in the art. The particular support used may affect the properties of the polymer being formed. Silica supports have primarily been used due to their ability to form highly active polymerization catalysts. Aluminum phosphate supports are similar to silica supports in that they form highly active catalysts. Preparation of these supports for use in a polymerization catalyst or in a polymerization catalyst system often employs both chemical and thermal treatments. Conventional methodologies employing treatment with caustic or corrosive chemicals has its drawbacks including, for example, issues of environmental effect. Furthermore, the elaborate methodologies to treat these supports may negatively impact the economics of the overall polymerization process. Thus, there is an ongoing need to develop new methods of preparing catalyst supports.

SUMMARY OF THE INVENTION

Disclosed herein is a method of preparing a composition comprising dry mixing commercial grade alumina and a solid sulfating agent to form a mixture and calcining the mixture to form a sulfated alumina support Various methods disclosed herein may comprise dehydrating boehmite to produce an alumina or otherwise obtaining a commercial grade alumina; dry mixing the alumina with a sulfating agent to produce a sulfate contacted alumina; calcining the sulfate contacted alumina to produce a calcined sulfated alumina; contacting the calcined sulfated alumina with at least one organometal compound (e.g., a compound that may form an active metal complex) and optionally a co-catalyst to form a polymerization catalyst system; contacting the polymerization catalyst system with at least one olefin monomer under conditions sufficient to polymerize the olefin monomer; and recovering the polymerized product.

DETAILED DESCRIPTION

Disclosed herein are polymerization catalyst compositions comprising a sulfated alumina support (SAS) and methods of making same. In an embodiment, the SAS is prepared by dry mixing a commercial grade alumina (CGA) or a precursor of the alumina with a solid sulfate source to form a mixture, and subsequently thermally treating (e.g., calcining) the mixture. The SAS may then be combined with one or more additional components (e.g., a metal compound and/or a cocatalyst) to form a polymerization catalyst system. These components and methods of preparing and utilizing the polymerization catalyst system will be described in more detail herein.

In an embodiment, the SAS comprises alumina ($Al_2O_3$), which may include various forms of crystalline alumina or alumina precursors such as boehmite (AlOOH), Gibsite [Al(OH)$_3$] or gamma alumina. The alumina may also comprise minor amounts of other materials that may be added for various reasons, such as fluoride, phosphate, silica, magnesia and/or titania. These materials may be added in the form of cogellation or by surface treatment. Alumina may be prepared using a variety of methods known to one of ordinary skill in the art. Examples of alumina preparation methods include: reacting sodium aluminate, which is basic, with aluminum sulfate, which is acidic; neutralizing an aluminum salt with a base such as ammonia or ammonia hydroxide; performing flame hydrolysis of an aluminum compound; or performing hydrolysis of an organic solution of an aluminum compound by, e.g., adding water to an alcohol solution of aluminum isopropoxide ($Al(OC_3H_7)_3$). Such processes may produce a hydrated form of alumina, for boehmite and gibbsite. Prior to being sold, the hydrated forms of alumina may be dehydrated, for example by heat treatment or calcination, to form anhydrous alumina. Upon completion of the commercial manufacturing process, the resulting material that is ready for sale, offered for sale, or delivery to a purchaser is herein referred to as commercial grade alumina (CGA). Thus, in some instances, the CGA may have an initial or post-production thermal history as a result of previous heat treatments associated with the commercial formation or manufacture thereof.

Post-manufacture, the CGA may become partially rehydrated by adventitious exposure to ambient moisture for example during storage and/or transport of the CGA. Rehydration via adventitious exposure is in contrast to intentional or desired rehydration via an affirmative process. As a result of adventitious exposure, the number of water molecules associated with the CGA may increase over time. Therefore, the CGA as made available to the user (e.g., at the time of purchase and/or at the time of end use) may comprise rehydrated alumina, alternatively may comprise an amount of water greater than the amount of water present upon completion of manufacture, or alternatively may comprise an amount of hydrated alumina greater than the amount of hydrated alumina present upon completion of manufacture. The CGA may continue to hydrate following preparation to give a material that comprises a mixture of anhydrous alumina and hydrated alumina. As will be understood by one of ordinary skill in the art, the hydration of the CGA will reach a maximum at some point in time, i.e., equilibrium, which will be dependent on a variety of factors including for example the relative temperature and humidity. Furthermore, it is to be understood that some commercially available CGAs may be provided with desiccant in proximity to the CGA. For example a pack containing silica gel or magnesium sulfate may be included in the package containing the CGA. The presence of such desiccants may reduce the extent of hydration of the CGA without resulting in an anhydrous CGA. Collectively, CGA having an amount of water and/or hydrated alumina greater than the amount present upon completion of manufacture will be referred to herein as a hydrated CGA (H-CGA). In an embodiment, a CGA and/or an H-CGA suitable for use in this disclosure has an initial thermal history as a result of its manufacture, provided however that the H-CGA has no additional heat treatment, dehydration or calcinations prior to the use described herein. For example, the CGA is made and sold commercially, the CGA may optionally undergo partial hydration during transport and/or storage to form H-CGA, and the CGA and/or H-CGA is used by a purchaser as described herein to form a composition, wherein the CGA and/or H-CGA does not undergo any additional heat treatment or dehydration steps prior to those described herein with respect to making the SAS. In an embodiment, the CGA and/or H-CGA does not undergo any further heat treatment at temperatures greater than ambient temperature, alternatively at temperatures equal to or greater than 150, 200, 250, 300, 350, 400, 450, 500, 550, 600, 650, 700, 750, 800, 850, 900, 950, or 1000° C.

In an embodiment, the CGA is prepared by the partial or complete dehydration of boehmite to form alumina. The dehydration of boehmite may be carried out in a temperature range of from about 200° C. to about 900° C., alternatively from about 300° C. to about 800° C., alternatively from about 400° C. to about 700° C. for a time period of from about 10 min to about 24 hours, alternatively from about 30 min to about 12 hours, alternatively from about 1 hour to about 6 hours. Alternatively, the CGA is prepared by the complete dehydration of boehmite to produce a CGA comprising anhydrous alumina, which may thereafter partially hydrate to form an H-CGA. CGAs suitable for use in this disclosure include for example and without limitation VGL 250 which is a CGA available from UOP LLC and Alumina A available from W. R. Grace and Company.

Preparation of the SAS further comprises contacting a CGA and/or an H-CGA with a source of sulfate anions, herein referred to as a sulfating agent. In an embodiment, the sulfating agent (SA) is in a solid form such as a solid sulfate salt. Examples of sulfating agents include without limitation $(NH_4)_2SO_4$, $(NH_4)HSO_4$, $(NH_4)HSO_3$ and combinations thereof. Sulfur containing materials that are capable of further oxidation to sulfate by thermal treatment, such as for example and without limitation sulfite salts, can also serve as the sulfating agent. In an embodiment, the sulfating agent is a sulfate salt in the solid form such as for example $(NH_4)_2SO_4$. In an embodiment, a solid sulfating agent, e.g., a sulfate salt such as $(NH_4)_2SO_4$, may be contacted with the CGA and/or an H-CGA by dry mixing or blending of the two components to form an alumina-SA blend. As used herein dry mixing or blending refers to intimately contacting two or more components in solid state (e.g., powder or particulate form) to form a homogenous mixture or blend. The alumina-SA blend may be prepared using any mixing device compatible with the CGA and/or H-CGA and sulfating agent. The CGA and/or H-CGA may be present in the alumina/SA blend in an amount of from about 99% to about 50%, alternatively from about 95% to about 75% alternatively from about 90% to about 80%. The sulfating agent may be present in the alumina/SA blend in an amount of from about 1% to about 50%, alternatively from about 5% to about 25%, alternatively from about 10% to about 20%. In an embodiment, the alumina and sulfating agent may be blended using a fluidized bed for a time period of from about 1 minute to about 24 hours, alternatively from about 3 hours to about 15 hours, alternatively from about 5 hours to about 12 hours in a temperature range of from about 200° C. to about 900° C., alternatively from about 400° C. to about 800° C., alternatively from about 500° C. to about 700° C.

The alumina/SA blend may be calcined to from a sulfated alumina support (SAS). The alumina/SA blend may be calcined by heating it in an oxidizing atmosphere, for example, in the presence of oxygen ($O_2$), at a temperature in a range of from about 200° C. to about 1,000° C., alternatively from about 300° C. to about 800° C., or from about 400° C. to about 700° C. The calcining treatment may also involve reducing or other steps, such as treatment with haliding agents. In some embodiments, the sulfating agent (e.g., a sulfate salt) used to prepare the alumina/SA blend may comprise a material which when calcined as disclosed will decompose to leave sulfate anions attached to the alumina support. In an embodiment, the sulfating agent is solid ammonium sulfate, $(NH_4)_2SO_4$. Without wishing to be limited by theory, solid $(NH_4)_2SO_4$ may decompose during the calcining step into $SO_3$ (or its hydrated form) and be absorbed by the alumina to form a SAS. Furthermore, the calcining treatment may additionally result in dehydration of an H-CGA component of the alumina/SA blend.

The polymerization catalyst composition may further comprise one or more organometal compounds (OMC). The OMC may be co-supported on the SAS and may be contacted or combined with the SAS and other components as described in more detail herein.

In an embodiment, the OMC comprises a metallocene compound. In another embodiment, the OMC has the general formula given in equation 1:

$$(X_1)(X_2)(X_3)(X_4)M_1 \qquad (1)$$

In this formula, $M_1$ is a titanium, zirconium, or hafnium. Alternatively, $M_1$ is zirconium. In this formula $X_1$ is independently (hereafter "Group I") a cyclopentadienyl, indenyl, fluorenyl, substituted cyclopentadienyl, substituted indenyl, such as, for example, tetrahydroindenyl, or substituted fluorenyl, such as, for example, octahydrofluorenyl. The substituents on the substituted cyclopentadienyls, substituted indenyls, and substituted fluorenyls, can be aliphatic groups, cyclic groups, combinations of aliphatic and cyclic groups, and organometallic groups, as long as these groups do not substantially, and adversely, affect the polymerization activity of the composition. Additionally, hydrogen can be a substituent. Suitable examples of aliphatic groups are hydrocarbyls, such as, for example, paraffins and olefins. Suitable examples of cyclic groups are cycloparaffins, cycloolefins, cycloacetylenes, and arenes. Additionally, alkylsilyl groups where each alkyl contains 1-12 carbon atoms, alkyl halide groups where each alkyl contains 1-12 carbon atoms, or halides, can also be used. Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, fluoro, chloro, bromo, and iodo. In this formula $X_3$ and $X_4$ are independently (hereafter "Group II") halides, aliphatic groups, cyclic groups, combinations of aliphatic and cyclic groups, or organometallic groups, as long as these groups do not substantially, and adversely, affect the polymerization activity of the composition. Suitable examples of aliphatic groups are hydrocarbyls, such as, for example, paraffins and olefins. Suitable examples of cyclic groups are cycloparaffins, cycloolefins, cycloacetylenes, and arenes. In an embodiment, $X_3$ and $X_4$ are halides or hydrocarbyls, where such hydrocarbyls have from 1 to 10 carbon atoms. Alternatively, $X_3$ and X are fluoro, chloro, or methyl. In this formula, $X_2$ can be selected independently from either Group I or Group II. When $X_2$ is selected from Group I, it should be noted that $X_1$ and $X_2$ can be joined with a bridging group, such as, for example, aliphatic bridging groups, cyclic bridging groups, combinations of aliphatic and cyclic bridging groups, and organometallic bridging groups, as long as the bridging group does not substantially, and adversely, affect the polymerization activity of the composition. Suitable examples of aliphatic bridging groups are hydrocarbyls, such as, for example, paraffins and olefins. Suitable examples of cyclic bridging groups are cycloparaffins, cycloolefins, cycloacetylenes, and arenes. Additionally, it should be noted that silicon and germanium are also good bridging units. Various processes are known to make these compositions. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579;

5,668,230; and 7,119,043 the entire disclosures of which are hereby incorporated by reference. Suitable metallocene complexes include for example and without limitation bis(cyclopentadienyl) zirconium dichloride, bis(n-butylcyclopentadienyl) zirconium dichloride, bis(indenyl) zirconium dichloride, bis(indenyl) zirconium dimethyl, methyl-3-butenylmethylidene($\eta^5$-cyclopentadienyl)($\eta^5$-9-fluorenyl)zirconium dichloride; methyl-3-butenylmethylidene($\eta^5$-cyclopentadienyl)($\eta^5$-2,7-di-t-butyl-9-fluorenyl)-zirconium dichloride; methyl-4-pentenylmethylidene($\eta^5$-cyclopentadienyl)($\eta^5$-9-fluorenyl)zirconium dichloride; methyl-4-pentenylmethylidene($\eta^5$-cyclopentadienyl)($\eta^5$-2,7-di-t-butyl-9-fluorenyl)zirconium dichloride; methyl-5-hexenylmethylidene($\eta^5$-cyclopentadienyl)($\eta^5$-9-fluorenyl) zirconium dichloride; methyl-5-hexenylmethylidene($\eta^5$-cyclopentadienyl)($\eta^5$-2,7-di-t-butyl-9-fluorenyl)zirconium dichloride; phenyl-3-butenylmethylidene($\eta^5$-cyclopentadienyl)($\eta^5$-9-fluorenyl)zirconium dichloride; phenyl-3-butenylmethylidene($\eta^5$-cyclopentadienyl)($\eta^5$-2,7-di-t-butyl-9-fluorenyl)zirconium dichloride; phenyl-4-pentenylmethylidene($\eta^5$-cyclopentadienyl)($\eta^5$-9-fluorenyl) zirconium dichloride; phenyl-4-pentenylmethylidene($\eta^5$-cyclopentadienyl)($\eta^5$-2,7-di-t-butyl-9-fluorenyl)zirconium dichloride; phenyl-5-hexenylmethylidene($\eta^5$-cyclopentadienyl)($\eta^5$-9-fluorenyl)zirconium dichloride; phenyl-5-hexenylmethylidene($\eta^5$-cyclopentadienyl)($\eta^5$-2,7-di-t-butyl-9-fluorenyl)zirconium dichloride; methyl-3-butenylsilylbis($\eta^5$-fluoren-9-yl)zirconium dichloride; methyl-4-pentenylsilylbis($\eta^5$-fluoren-9-yl)zirconium dichloride; methyl-5-hexenylsilylbis($\eta^5$-fluoren-9-yl)zirconium dichloride; methyl-6-heptenylsilylbis($\eta^5$-fluoren-9-yl)zirconium dichloride; methyl-7-octenylsilylbis($\eta^5$-fluoren-9-yl)zirconium dichloride; or any combination thereof.

The polymerization catalyst composition may further comprise one or more co-catalysts. The SAS, OMC, and co-catalyst may be contacted or combined as described in more detail herein.

Generally, the cocatalyst can be any organometallic compound capable of activating the OMCs described herein to polymerize olefins. In an embodiment, the cocatalyst is a metal alkyl. The metal alkyl can have any number of carbon atoms. However, due to commercial availability and ease of use, the metal alkyl will usually comprise less than about 70 carbon atoms per metal alkyl molecule and alternatively less than about 20 carbon atoms per molecule. Examples of suitable cocatalysts include organoaluminum compounds such as triethylaluminum, tri-isobutylaluminum and combinations thereof. Other suitable organoaluminum compounds include aluminum alkyls such as $R_3{}^4Al$, $R_2{}^4AlX$, and $R^4AlX_2$ compounds where $R^4$ is a 1 to 12 carbon atom hydrocarbyl radical and X is a halogen such as chlorine. The cocatalyst may, for example, be diethylaluminum chloride or ethylaluminum dichloride.

The cocatalyst may be premixed with the catalyst, or alternatively it may be introduced into the reaction zone as a separate stream. The amount of cocatalyst present in the reaction zone may be in the range of from about 1 to about 250 or from about 10 to about 100 parts per million by weight based on the weight of the solvent or diluent in systems employing such solvent or diluent. When no solvent or diluent is used, the catalyst may be impregnated with the cocatalyst in an amount that provides for a cocatalyst to OMC mole ratio in the range of from about 1:1 to about 1:1000, alternatively from about 1:2 to about 1:100, or alternatively from about 1:3 to about 1:30.

As disclosed herein, a method of preparing a polymerization catalyst system comprises contacting a SAS, an OMC and optionally a cocatalyst. The amount of each component used to prepare the polymerization catalyst system can be any amount such that, when combined to form the catalyst system, polymerization occurs upon contact with one or more olefins. Contacting of the catalyst components can be done under any conditions sufficient to thoroughly contact the components. Typically, contacting is performed in an inert atmosphere, such as, for example, in nitrogen and/or argon. The reaction temperature for preparing a polymerization catalyst system can be any temperature. For ease of operation, ambient temperature can be employed.

In the various embodiments disclosed herein, contacting of catalyst components (e.g., a SAS, OMC and the optional cocatalyst) may occur in one or more contact zones. A contact zone is a zone in which the components are commingled and/or combined, and thereby contacted. The contact zone may be disposed in a vessel, e.g. a storage tank, tote, container, mixing vessel, reactor, etc.; a length of pipe, e.g. a tee, inlet, injection port, or header for combining component feed lines into a common line; or any other suitable apparatus for bringing the components into contact. As used herein, the terms contacted and combined refer to any addition sequence, order, or concentration for contacting or combining two or more catalyst components. As a result of such contact or combination, the catalyst components may remain discrete, unattached or unbonded particles or may otherwise physically combine, attach, bond, co-support, agglomerate, etc. In some embodiments, contacting of components may occur in one or more upstream contact zone(s) prior to further contacting with other catalyst component(s) in one or more downstream contact zone(s). Where a plurality of contact zones are employed, contacting may occur simultaneously across the contact zones, sequentially across the contact zones, or both, as is suitable for a given embodiment. Contacting may be carried out in a batch or continuous process, as is suitable for a given embodiment.

In embodiments utilizing a vessel for contacting the components, the components may be optionally mixed by a mixer disposed in the vessel and the formed mixture may then be removed for subsequent processing. In embodiments, utilizing a tee or other means for combining lines such as a header, an optional in-line mixer may be placed in the commingled catalyst feed line to ensure that adequate contacting of the combined components takes place, and the mixture is thus formed as it passes through the commingled feed line. Where a method of making a catalyst recites contact or combination of catalyst components, such may be carried out by contacting or combining all or a portion of such components in various embodiments. In an embodiment, the SAS, OMC and cocatalyst may be introduced to a pre-reactor vessel and allowed to contact ex situ for some duration of time prior to contacting additional components for the polymerization of an olefin. Alternatively, the SAS, OMC and optional cocatalyst may be utilized in situ and fed directly into a system having the components necessary for the polymerization of an olefin.

In an embodiment, the catalyst system comprises a SAS, an OMC comprising a metallocene compound of the type described herein and a trialkylaluminum cocatalyst. In some embodiments, the OMC comprising a metallocene compound of the type described herein may be pretreated with an alkylating agent such that the OMC is alkylated prior to introduction to a reactor vessel for use in a polymerization catalyst system. In such embodiments, the polymerization catalyst system need not include a cocatalyst as disclosed herein.

The catalysts of the present disclosure are intended for any olefin polymerization method known in the art, using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor. Such reactors may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), which is well known in the art is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4588,790 and 5,436,304, each of which is incorporated by reference in its entirety herein.

According to still another aspect of the disclosure, a high pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, resistance to crack growth, long chain branching and rheological measurements.

The concentrations of monomer, co-monomer, hydrogen, co-catalyst, modifiers, and electron donors are important in producing these resin properties. Comonomer is used to control product density. Hydrogen is used to control product molecular weight. Co-catalysts can be used to alkylate, scavenge poisons and control molecular weight. Modifiers can be used to control product properties and electron donors affect stereoregularity. In addition, the concentration of poisons must be minimized since they impact the reactions and product properties.

After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

In an embodiment, a slurry polymerization process is employed in which the catalyst is suspended in an inert organic medium and agitated to maintain it in suspension throughout the polymerization process. The organic medium may, e.g., be a paraffin, a cycloparaffin, or an aromatic. For the production of ethylene polymers, the slurry polymerization process may be carried out in a reaction zone at a temperature of from about 50° C. to about 110° C. and at a pressure in the range of from about 100 psia to about 700 psia or higher. At least one monomer is placed in the liquid phase of the slurry in which the catalyst is suspended, thus providing for contact between the monomer and the catalyst. The activity and the productivity of the catalyst are relatively high. As used herein, the activity refers to the grams of polymer produced per gram of solid catalyst charged per hour, and the productivity refers to the grams of polymer produced per gram of solid catalyst charged.

In one embodiment, the monomer is contacted with the co-catalyst in addition to the SAS and OMC. The co-catalyst may be contacted with the SAS and OMC either before or after entry into the reaction zone. For example, the SAS, OMC and co-catalyst may each be fed independently into a mixing vessel ahead of the reactor where they are allowed to pre-contact each other in a hydrocarbon solvent for a period of from about 1 minute to about 10 hours at temperatures ranging from about −20° C. to about 100° C. After this duration, the contacted SAS, OMC and co-catalyst are fed to the reaction zone. Since each feed stream can be measured and controlled independently, pre-contacting the SAS, OMC and the co-catalyst provides a method of continuously controlling the composition of the polymerization catalyst system and thereby the properties of the polymer produced. Alternatively, some or all of SAS, OMC and the co-catalyst may also be fed directly into the reaction zone where they contact each other for the first time in the presence of the monomer. In another embodiment, the monomer may be contacted with more than one OMC.

Polymers such as polyethylene homopolymers and copolymers of ethylene with other mono-olefins may be produced in the manner described above. Polymer resins produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth. Additional end use articles would be apparent to those skilled in the art.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner.

Example 1

A sulfated alumina support was prepared by dry mixing 20 g of commercial grade boehmite, obtained from W. R. Grace under the name Alumina-A, with the indicated amount of ammonium sulfate, Table 1. The mixture was then calcined at 600° C. for 3 hours. The resultant calcined sulfated alumina was contacted with 3.3 mg of the metallocene methyl-3-butenylmethylidene($\eta^5$-cyclopentadienyl)($\eta^5$-2,7-di-t-butyl-9-fluorenyl)zirconium dichloride and 0.5 mL of 1M triisobutylaluminum and used to polymerize ethylene and 45 g of hexane at 90° C. and 450 psig. Table 1 presents the results of the polymerization reaction experiments (Samples #1 and #2) in comparison to an otherwise identical experiment (Sample #3) conducted using a polymerization catalyst system comprising an alumina support that was calcined both before (precalcined) and after contact with a sulfating agent.

TABLE 1

|  | Sample #1 | Sample #2 | Sample #3 |
|---|---|---|---|
| Preparation method | Dry Mix | Dry Mix | Dry Mix |
| $SO_4$ added mmol/g | 1.56 | 3.10 | 1.56 |
| Precalcined | No | No | Yes |
| Surface Area | 340 | 308 | 288 |
| Pore Volume | 1.30 | 1.40 | 1.33 |
| XRF mmol $SO_4$/g $Al_2O_3$ | 1.39 | 2.01 | 1.18 |
| Activity Kg/g-h | 4874 | 4819 | 4827 |

TABLE 1-continued

|  | Sample #1 | Sample #2 | Sample #3 |
|---|---|---|---|
| Melt Index | 0.00 | 0.00 | 0.00 |
| HLMI | 1.00 | 0.89 | 0.80 |

The results demonstrate that polymerization catalyst systems comprising an alumina support dry mixed with a solid sulfating agent and then calcined had catalytic activity comparable to a polymerization catalyst system comprising an alumina support calcined prior to and after contact with a sulfating agent.

While various embodiments have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of preparing a composition comprising dry mixing commercial grade alumina and a solid sulfating agent to form a mixture and calcining the mixture to form a sulfated alumina support, and wherein the solid sulfating agent comprises $(NH_4)_2SO_4$, $(NH_4HSO_4$, $(NH_4)HSO_3$ or combinations thereof.

2. The method of claim 1 wherein the commercial grade alumina is prepared from the dehydration of boehmite.

3. The method of claim 1 wherein the commercial grade alumina does not undergo further heat treatment prior to mixture with the solid sulfating agent.

4. The method of claim 1 wherein the sulfating agent decomposes upon thermal treatment to leave sulfate anions attached to the alumina.

5. The method of claim 1 wherein commercial grade alumina is present in the mixture in an amount of from about 99% to about 50%.

6. The method of claim 1 wherein the sulfating agent is present in the mixture in an amount of from about 1% to about 50%.

7. The method of claim 1 wherein the mixture is calcined at a temperature of from about 200° C. to about 900° C.

8. The method of claim 1 wherein the mixture is calcined for a time period of from about 1 minute to about 24 hours.

9. The method of claim 2 wherein the commercial grade alumina does not undergo further heat treatment prior to mixture with the solid sulfating agent.

10. The method of claim 2 wherein the sulfating agent decomposes upon thermal treatment to leave sulfate anions attached to the alumina.

11. The method of claim 2 wherein commercial grade alumina is present in the mixture in an amount of from about 99% to about 50% and the sulfating agent is present in the mixture in an amount of from about 1% to about 50%.

12. The method of claim 2 wherein the mixture is calcined at a temperature of from about 200° C. to about 900° C. and for a time period of from about 1 minute to about 24 hours.

13. The method of claim 1, further comprising contacting the sulfated alumina support with an organo metal compound to form a mixture.

14. The method of claim 2, further comprising contacting the sulfated alumina support with an organo metal compound to form a mixture.

15. The method of claim 13, wherein the organo metal compound comprises a metallocene.

16. The method of claim 14, wherein the organo metal compound comprises a metallocene.

17. The method of claim 13, wherein the mixture is contacted with a cocatalyst to produce a catalyst system.

18. The method of claim 14, wherein the mixture is contacted with a cocatalyst to produce a catalyst system.

19. The method of claim 17, further comprising contacting the catalyst system with ethylene under conditions suitable to form polyethylene.

20. The method of claim 18, further comprising contacting the catalyst system with ethylene under conditions suitable to form polyethylene.

* * * * *